United States Patent
Kang et al.

(10) Patent No.: US 12,377,830 B2
(45) Date of Patent: Aug. 5, 2025

(54) BYPASS ENERGY STORAGE DEVICE FOR ELECTRONICALLY CONTROLLED HYDRAULIC BRAKING SYSTEM AND CONTROL METHOD THEREOF

(71) Applicant: GLOBAL TECHNOLOGY CO., LTD., Nantong (CN)

(72) Inventors: Peidong Kang, Nantong (CN); Zhaoyong Liu, Nantong (CN); Qindong Gu, Nantong (CN); Jie Ji, Nantong (CN); Zheng Wu, Nantong (CN)

(73) Assignee: GLOBAL TECHNOLOGY CO., LTD., Nantong (CN)

( * ) Notice: Subject to any disclaimer, the term of this patent is extended or adjusted under 35 U.S.C. 154(b) by 509 days.

(21) Appl. No.: 17/927,751

(22) PCT Filed: Aug. 5, 2021

(86) PCT No.: PCT/CN2021/110803
§ 371 (c)(1),
(2) Date: Nov. 25, 2022

(87) PCT Pub. No.: WO2022/028519
PCT Pub. Date: Feb. 10, 2022

(65) Prior Publication Data
US 2023/0211762 A1    Jul. 6, 2023

(30) Foreign Application Priority Data
Aug. 7, 2020 (CN) .......................... 202010787667.6

(51) Int. Cl.
*B60T 13/16* (2006.01)
*B60T 13/22* (2006.01)
*B60W 50/10* (2012.01)

(52) U.S. Cl.
CPC ............ *B60T 13/168* (2013.01); *B60T 13/22* (2013.01); *B60W 50/10* (2013.01)

(58) Field of Classification Search
CPC .......... B60T 1/10; B60T 7/042; B60T 13/686; B60T 13/168; B60T 13/22; B60T 17/22;
(Continued)

(56) References Cited

U.S. PATENT DOCUMENTS

| 2007/0192010 A1* | 8/2007 | Carlstrom ....... B60W 30/18136 |
| | | 701/53 |
| 2013/0026817 A1* | 1/2013 | Morishita ............. B60T 13/686 |
| | | 303/3 |

(Continued)

FOREIGN PATENT DOCUMENTS

| CN | 105015528 A | 11/2015 |
| CN | 209955966 U | 1/2020 |

(Continued)

OTHER PUBLICATIONS

English machined translation of CN-209955966 U, Jan. 17, 2020.*

*Primary Examiner* — Robert A. Siconolfi
*Assistant Examiner* — San M Aung
(74) *Attorney, Agent, or Firm* — Bayramoglu Law Offices LLC

(57) ABSTRACT

A bypass energy storage device for an electronically controlled hydraulic braking system includes a brake master cylinder, a first pipeline, and a second pipeline. The first pipeline is connected with a first branch. One end of the first branch is communicated to an energy accumulator, and the first branch is connected with a first inlet valve. The second pipeline is connected with a second branch. One end of the second branch is communicated to the energy accumulator, and the second branch is connected with a second inlet valve. The energy accumulator is communicated with a third branch, and one end of the third branch is communicated to (Continued)

a second pipeline. The effects of reducing energy consumption, better controlling foot feeling and thus improving the comfort and safety of products are achieved.

7 Claims, 2 Drawing Sheets

(58) Field of Classification Search
CPC .. B60T 2220/04; B60T 2270/604; B60L 7/24; B60L 7/10; B60L 2240/545; B60L 2240/547; B60L 2250/26; B60W 50/10
USPC ...................................................... 303/114.1
See application file for complete search history.

(56) References Cited

U.S. PATENT DOCUMENTS

| | | | |
|---|---|---|---|
| 2016/0137068 A1* | 5/2016 | Nada | ................ B60T 8/172 701/70 |
| 2018/0162340 A1 | 6/2018 | Irwan et al. | |
| 2018/0297475 A1* | 10/2018 | Zhao | .................. B60L 7/18 |

FOREIGN PATENT DOCUMENTS

| | | |
|---|---|---|
| CN | 111907495 A | 11/2020 |
| DE | 102007028070 A1 | 12/2008 |
| EP | 3333033 A1 | 6/2018 |
| EP | 3459801 A1 | 3/2019 |
| WO | 2019221554 A1 | 11/2019 |

* cited by examiner

BYPASS ENERGY STORAGE DEVICE FOR ELECTRONICALLY CONTROLLED HYDRAULIC BRAKING SYSTEM AND CONTROL METHOD THEREOF

CROSS REFERENCE TO THE RELATED APPLICATIONS

This application is the national phase entry of International Application No. PCT/CN2021/110803, filed on Aug. 5, 2021, which is based upon and claims priority to Chinese Patent Application No. 202010787667.6, filed on Aug. 7, 2020, the entire contents of which are incorporated herein by reference.

TECHNICAL FIELD

The present invention relates to the field of new energy automobile braking systems, and in particular to a bypass energy storage device for an electronically controlled hydraulic braking system and a control method thereof.

BACKGROUND

In the modern automobile market, the number of new energy automobiles is increasing, and one of the most concerned problems of people, whether pure electric vehicles or hybrid electric vehicles, is the driving mileage of the automobiles. Almost all new energy automobiles in the market are equipped with an energy recovery function. The braking energy recovery system is a method adopted for prolonging the endurance mileage, wherein the conversion of mechanical energy into electric energy through braking plays a dominant role. However, the recovery of braking energy tends to give drivers a feeling of inconsistent brake pedal stroke.

SUMMARY

The purpose of the present invention is to provide a bypass energy storage device for an electronically controlled hydraulic braking system, wherein under two conditions that a vehicle energy recovery function is switched on and switched off, the vehicle deceleration is the same for the same pedal stroke; for a driver, the strokes of stepping on the brake pedal are consistent, so that the energy consumption can be reduced, and the driver can better control foot feeling, thereby improving the comfort and the safety of products.

The technical purpose of the present invention is realized by the following technical solution:
Provided is a bypass energy storage device for an electronically controlled hydraulic braking system, which comprises a brake master cylinder, wherein a first pipeline and a second pipeline are arranged at an outlet end of the brake master cylinder, the other end of the first pipeline is connected with a fourth isolation valve for controlling the on-off of the first pipeline, and the other end of the second pipeline is connected with a fifth isolation valve for controlling the on-off of the second pipeline; the other ends of the fourth isolation valve and the fifth isolation valve are both communicated to an ABS/ESC;
the first pipeline is also connected with a first branch, the other end of the first branch is communicated to an energy accumulator, and the first branch is connected with a first inlet valve for controlling the on-off of the first branch;
the second pipeline is also connected with a second branch, the other end of the second branch is also communicated to the energy accumulator, and the second branch is connected with a second inlet valve for controlling the on-off of the second branch;
the energy accumulator is also communicated with a third branch, the other end of the third branch is communicated to the first pipeline or the second pipeline, and the third branch is connected with a third return valve for controlling the on-off of the third branch.

Furthermore, the working state of the device comprises the pressurization process and the pressure-relief process; wherein
the pressurization process is as follows: after the electronically controlled hydraulic controller detects that the driver steps on the pedal and the whole vehicle simultaneously starts the energy recovery function, the first inlet valve and the second inlet valve are opened, the fourth isolation valve and the fifth isolation valve are closed, and the brake fluid enters the energy accumulator through the brake master cylinder, the first inlet valve and the second inlet valve;
braking forces on wheels are provided by back dragging of a driving motor, the whole vehicle performs a braking energy recovery work, the electronically controlled hydraulic controller monitors the opening degree of the pedal at all times, and magnitudes of a total braking force request and back-drag torque are determined;
when the back-drag torque is insufficient, the first inlet valve and the second inlet valve are closed, the fourth isolation valve and the fifth isolation valve are opened, and an insufficient braking force is supplemented with a hydraulic pressure; the back-dragging of the motor and mechanical braking co-work in a serial mode to achieve a deceleration effect of the vehicle;
the pressure-relief process is as follows: in a pressure reduction stage, as the driver releases the pedal or is in a process of releasing, the first inlet valve and the second inlet valve are powered off and closed, the fourth isolation valve and the fifth isolation valve are powered off and opened, and the third return valve is powered on and opened according to pressures of the pipelines, as the brake pedal is not stepped on or a pressure of a main hydraulic circuit is small at the moment, a pressure of the brake master cylinder does not exist, and under the action of the pressure, the brake fluid in the low-pressure energy accumulator returns to the master cylinder through the third return valve under the action of an internal spring.

Furthermore, a working condition of the device also comprises a normal condition that when an energy recovery function is switched off and when a driver steps on a brake pedal, all electromagnetic valves are kept in a power-off state, and a brake fluid directly enters the ABS/ESC through the master cylinder, the fourth isolation valve and the fifth isolation valve.

Furthermore, the first pipeline is connected with a pressure sensor for sensing the pressure of the pipeline.

Furthermore, the energy accumulator is a spring-type low-pressure energy accumulator.

Furthermore, each valve of the device is controlled to be opened and closed by the electronically controlled hydraulic controller EHC, and the electronically controlled hydraulic controller EHC is also connected with a battery controller BCM and a motor controller MCU via high-speed CAN communication.

Another purpose of the present invention is to provide a control method of a bypass energy storage device for an electronically controlled hydraulic braking system, wherein under two conditions that a vehicle energy recovery function is switched on and switched off, for a driver, the strokes of stepping on the brake pedal are consistent, so that the energy consumption can be reduced, and the driver can better control foot feeling, thereby improving the comfort and the safety of products.

Provided is a control method of a bypass energy storage device for an electronically controlled hydraulic braking system, which comprises the following steps:

step I: monitoring, by an electronically controlled hydraulic controller, whether a driver has a braking intention or not in real time, specifically comprising acquiring a signal of a displacement sensor of a brake pedal through AD, determining and calculating a depth and a speed of the driver for stepping on the brake pedal, and then obtaining a braking deceleration a required by a vehicle at the moment according to a vehicle braking characteristic matching parameter table;

step II: determining whether the driver is in emergency braking or not according to an opening degree of the pedal and the speed of stepping on the pedal; if yes, closing the energy recovery function;

step III: when the energy recovery function is switched off, entering a working state under a normal condition, and directly performing hydraulic braking;

when the energy recovery function is switched on, entering, by the device, a working state during a pressurization process, and distributing electric braking torque and hydraulic braking torque; and step VI: when the driver releases the pedal or is in a process of releasing, entering, by the device, a pressure-relief process.

Furthermore, in the step II, if the driver is not in emergency braking, the electronically controlled hydraulic controller EHC keeps communication with two systems of the battery controller BCM and the motor controller MCU at all times, so as to determine whether the vehicle is allowed to enter an energy recovery state or not, and the determination is performed according to a judgment basis including constant changes of the back-drag torque of the driving motor along with vehicle speeds, an SOC, a temperature, a current and communication faults of a power battery.

Furthermore, in the step III, a reference calculation formula for distributing the braking torque is as follows:

$$\text{if } Fe+Fh+f_{roll}+f_{aero}=Ma \quad (1)$$

$$\text{then } Fe=Ma-Fh-f_{roll}-f_{aero} \quad (2)$$

in the formula, Fe is a braking force of the driving motor in a unit of N·m; Fh is an electronically controlled hydraulic braking force in a unit of N·m; $F_{roll}$ is a rolling resistance of the vehicle in a unit of N·m; $f_{aero}$ is a wind resistance in a unit of N·m; a is the braking deceleration in a unit of m/s²; m is a mass of the whole vehicle in a unit of kg;

wherein the rolling resistance of the vehicle can be expressed as follows:

$$f_{roll}=Mg\mu\cos a \quad (3)$$

in the formula, μ is a rolling resistance coefficient; M is the mass of the whole vehicle in a unit of kg; a is a slope angle, i is a gradient, and a=arctan (i);

the wind resistance of the vehicle can be expressed as follows: $F_{aero}=0.5 \rho kA_fV^2$ (4)

in the formula, k is a wind resistance coefficient; $A_f$ is a frontal area in a unit of m²; V is a speed of the vehicle in a unit of km/h; ρ is an air density and taken as 1.3 kg/m².

Furthermore, in the step III, a rechargeable power generates torque $$Pc = \frac{9550Pc}{n} \quad (5)$$

in the formula, Pc is the rechargeable power in a unit of Kw; n is a rotating speed of the motor in a unit of rpm; corresponding maximum allowable braking torque of the battery is calculated according to a maximum allowable charging power of the battery, and if the maximum allowable braking torque of the battery is smaller than maximum allowable braking torque of the motor, the energy recovery function is switched off or the maximum allowable braking torque of the battery is taken as a maximum electric braking torque request.

In conclusion, the present invention has the following beneficial effects:

Under two conditions that a vehicle energy recovery function is switched on and switched off, for a driver, the vehicle deceleration is the same for the same pedal stroke, and the strokes of stepping on the brake pedal are consistent. The foot feeling gives people a reliable and safe feeling, and simultaneously, part of components can be extracted separately. The energy recovery on a vehicle can not only reduce energy consumption, but also better control foot feeling, thereby improving the comfort and safety of products.

In the FIG., 1 is a brake master cylinder; 2 is a first inlet valve; 3 is a second inlet valve; 4 is a third return valve; 5 is a fourth isolation valve; 6 is a fifth isolation valve; 7 is an energy accumulator; 8 is a pressure sensor.

DETAILED DESCRIPTION OF THE EMBODIMENTS

The detailed description of the present invention is further illustrated below with reference to the accompanying drawings, to which, however, the present invention is not limited.

Figure 1:
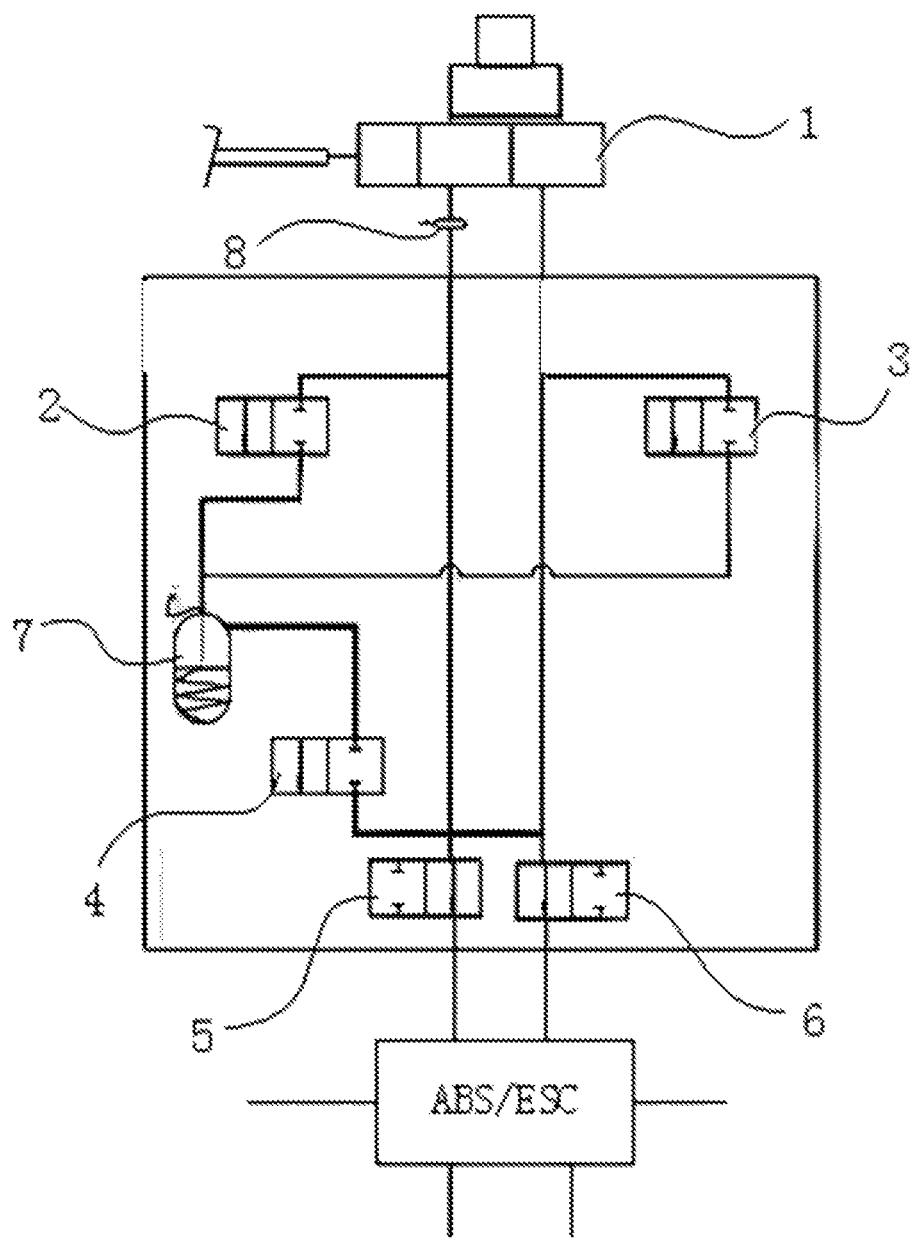
FIG. 1 is a schematic diagram of an overall structure of the present invention.

Provided is a bypass energy storage device for an electronically controlled hydraulic braking system, as shown in FIG. 1, the device comprises a brake master cylinder 1, wherein a first pipeline and a second pipeline are arranged at an outlet end of the brake master cylinder 1, the other end of the first pipeline is connected with a fourth isolation valve 5 for controlling the on-off of the first pipeline, and the other end of the second pipeline is connected with a fifth isolation valve 6 for controlling the on-off of the second pipeline; the other ends of the fourth isolation valve 5 and the fifth isolation valve 6 are both communicated to an ABS/ESC.

As shown in FIG. 1, the first pipeline is also connected with a first branch, the other end of the first branch is communicated to an energy accumulator 7, and the first branch is connected with a first inlet valve 2 for controlling the on-off of the first branch; the first pipeline is connected with a pressure sensor 8 for sensing the pressure of the pipeline, and the pressure sensor 8 is located between the first branch and the brake master cylinder 1.

The second pipeline is also connected with a second branch, the other end of the second branch is also communicated to the energy accumulator 7, the energy accumulator 7 is a spring-type low-pressure energy accumulator 7, and the second branch is connected with a second inlet valve 3 for controlling the on-off of the second branch.

The energy accumulator 7 is also communicated with a third branch, the other end of the third branch is communicated to the second pipeline, and the third branch is connected with a third return valve 4 for controlling the on-off of the third branch.

As shown in FIG. 1, in the present embodiment, the first inlet valve 2, the second inlet valve 3 and the third return valve 4 are all normally-closed two-position two-way valves, and the fourth isolation valve 5 and the fifth isolation valve 6 are both normally-open two-position two-way valves.

Figure 2:
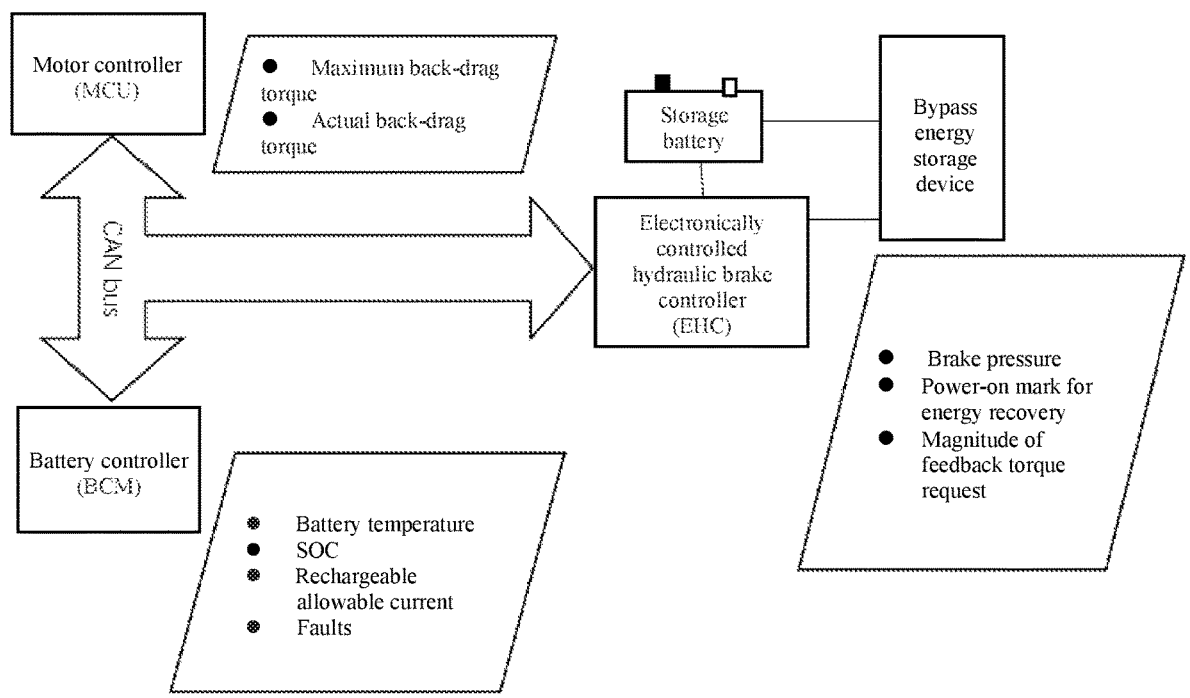
FIG. 2 is a schematic diagram of the electrical connection of the present invention.

As shown in FIG. 2, each valve of the device is controlled to be opened and closed by the electronically controlled hydraulic controller EHC, and the electronically controlled hydraulic controller EHC is also connected with a battery controller BCM and a motor controller MCU via high-speed CAN communication. The execution controller receives a control signal of the electronically controlled hydraulic controller EHC and drives each electromagnetic valve which can work independently through a power device of the execution controller so as to control a circulation path of a brake fluid pipeline; a power supply of a storage battery of a vehicle or a direct current-to-direct current converter (DC/DC) is directly connected with the actuator to supply power for the electromagnetic valves and the like, wherein the normal working voltage of the power supply of the storage battery is 9V to 16V, and a liquid level sensor for sensing the liquid storage amount is connected in the liquid storage device.

The basic control concept of the bypass device system is as follows: the electronically controlled hydraulic controller EHC calculates whether the braking request of a driver and the energy recovery condition are met or not and considers the stability of the vehicle, and sends a feedback braking torque request to the motor controller and simultaneously controls the bypass device.

The specific control method comprises the following steps:

step I: monitoring, by an electronically controlled hydraulic controller, whether a driver has a braking intention or not in real time, specifically comprising acquiring a signal of a displacement sensor of a brake pedal through AD, determining and calculating a depth and a speed of the driver for stepping on the brake pedal, and then obtaining a braking deceleration a required by a vehicle at the moment according to a vehicle braking characteristic matching parameter table;

step II: determining whether the driver is in emergency braking or not according to an opening degree of the pedal and the speed of stepping on the pedal; if yes, closing the energy recovery function; if the driver is not in emergency braking, the electronically controlled hydraulic controller EHC keeps communication with two systems of the battery controller BCM and the motor controller MCU at all times, so as to determine whether the vehicle is allowed to enter an energy recovery state or not, and the determination is performed according to a judgment basis including constant changes of the back-drag torque of the driving motor along with vehicle speeds, an SOC, a temperature, a current and communication faults of a power battery;

step III: when the energy recovery function is switched off, entering a working state under a normal condition, and directly performing hydraulic braking;

wherein the normal condition is as follows: when an energy recovery function is switched off and when a driver steps on a brake pedal, all electromagnetic valves are kept in a power-off state, and a brake fluid directly enters the ABS/ESC through the master cylinder, the fourth isolation valve 5 and the fifth isolation valve 6 (if the vehicle is not equipped with the ABS/ESC, the brake fluid directly enters the four wheel cylinders), and hydraulic braking is full braking force.

When the energy recovery function is switched on, the device enters a working state during a pressurization process, and electric braking torque and hydraulic braking torque are distributed; the back-drag torque of the motor is determined by a motor controller or a wheel speed sensor.

The pressurization process is as follows: after the electronically controlled hydraulic controller detects that the driver steps on the pedal and the whole vehicle simultaneously starts the energy recovery function, the first inlet valve 2 and the second inlet valve 3 are opened, the fourth isolation valve 5 and the fifth isolation valve 6 are closed, and the brake fluid enters the energy accumulator 7 through the brake master cylinder 1, the first inlet valve 2 and the second inlet valve 3.

Braking forces on wheels are provided by back dragging of a driving motor, the whole vehicle performs a braking energy recovery work, the electronically controlled hydraulic controller monitors the opening degree of the pedal at all times, and magnitudes of a total braking force request and back-drag torque are determined.

When the back-drag torque is insufficient, the first inlet valve 2 and the second inlet valve 3 are closed, the fourth isolation valve 5 and the fifth isolation valve 6 are opened, and an insufficient braking force is supplemented with a hydraulic pressure; the back-dragging of the motor and mechanical braking co-work in a serial mode to achieve a deceleration effect of the vehicle.

A rechargeable power generates torque $$Pc = \frac{9550Pc}{n} \qquad (5)$$

In the formula, Pc is the rechargeable power in a unit of Kw; n is a rotating speed of the motor in a unit of rpm.

Corresponding maximum allowable braking torque of the battery is calculated according to a maximum allowable charging power of the battery, and if the maximum allowable braking torque of the battery is smaller than maximum allowable braking torque of the motor, the maximum allowable braking torque of the battery is taken as a maximum electric braking torque request, that is the minimum one of the braking force request, the maximum allowable braking torque of the battery and the maximum allowable braking torque of the motor is taken as a feedback braking torque request, and the EHC sends the feedback braking torque request to the motor controller; in the braking process, the motor controller may send out the currently maximum available back-drag torque of the regenerative braking system through CAN communication; the electronically controlled hydraulic controller EHC may determine whether to allow the vehicle to enter the energy recovery mode and the rechargeable torque command value according to the battery controller BCM charge permission condition and the driver's intention.

A reference calculation formula for distributing the braking torque is as follows:

$$\text{if } Fe + Fh + f_{roll} + f_{aero} = Ma \quad (1)$$

$$\text{then } Fe = Ma - Fh - f_{roll} - f_{aero} \quad (2)$$

In the formula, Fe is a braking force of the driving motor in a unit of N·m; Fh is an electronically controlled hydraulic braking force in a unit of N·m; $F_{roll}$ is a rolling resistance of the vehicle in a unit of N·m; $f_{aero}$ is a wind resistance in a unit of N·m; a is the braking deceleration in a unit of m/s²; m is a mass of the whole vehicle in a unit of kg;

wherein the rolling resistance of the vehicle can be expressed as follows:

$$f_{roll} = Mg\mu\cos a \quad (3)$$

In the formula, μ is a rolling resistance coefficient; M is the mass of the whole vehicle in a unit of kg; a is a slope angle, i is a gradient, and a=arctan (i).

The wind resistance of the vehicle can be expressed as follows: $F_{aero} = 0.5 \, \rho k A_f V^2$ (4)

In the formula, k is a wind resistance coefficient; $A_f$ is a frontal area in a unit of m²; V is a speed of the vehicle in a unit of km/h; p is an air density and taken as 1.3 kg/m².

step VI: when the driver releases the pedal or is in a process of releasing, entering, by the device, a pressure-relief process.

The pressure-relief process is as follows: in a pressure reduction stage, as the driver releases the pedal or is in a process of releasing, the first inlet valve 2 and the second inlet valve 3 are powered off and closed, the fourth isolation valve 5 and the fifth isolation valve 6 are powered off and opened, and the third return valve 4 is powered on and opened according to pressures of the pipelines, as the brake pedal is not stepped on or a pressure of a main hydraulic circuit is small at the moment, a pressure of the brake master cylinder 1 does not exist, and under the action of the pressure, the brake fluid in the low-pressure energy accumulator 7 returns to the master cylinder through the third return valve 4 under the action of an internal spring.

The above mentioned contents are only preferred embodiments of the present invention and are not intended to limit the present invention. Various modifications or equivalent substitutions made by those skilled in the art within the spirit and protection scope of the present invention shall fall within the protection scope of the technical solution of the present invention.

What is claimed is:

1. A control method of a bypass energy storage device for an electronically controlled hydraulic braking system, wherein the bypass energy storage device for the electronically controlled hydraulic braking system used in the control method comprises a brake master cylinder, wherein a first pipeline and a second pipeline are arranged at an outlet end of the brake master cylinder, one end of the first pipeline is connected with a fourth isolation valve for controlling an on-off of the first pipeline, and one end of the second pipeline is connected with a fifth isolation valve for controlling an on-off of the second pipeline; one end of the fourth isolation valve and one end of the fifth isolation valve are both communicated to an ABS/ESC;

the first pipeline is also connected with a first branch, one end of the first branch is communicated to an energy accumulator, and the first branch is connected with a first inlet valve for controlling an on-off of the first branch;

the second pipeline is also connected with a second branch, one end of the second branch is also communicated to the energy accumulator, and the second branch is connected with a second inlet valve for controlling an on-off of the second branch;

the energy accumulator is also communicated with a third branch, one end of the third branch is communicated to the first pipeline or the second pipeline, and the third branch is connected with a third return valve for controlling an on-off of the third branch;

a working condition of the bypass energy storage device also comprises a normal condition, wherein the normal condition is defined as: when an energy recovery function is switched off and when a driver steps on a brake pedal, all electromagnetic valves are kept in a power-off state, and a brake fluid directly enters the ABS/ESC through the brake master cylinder, the fourth isolation valve, and the fifth isolation valve;

the control method comprises the following steps:

step I: monitoring, by an electronically controlled hydraulic controller, whether the driver has a braking intention or not in real time, specifically comprising acquiring a signal of a displacement sensor of the brake pedal through AD, determining and calculating a depth and a speed of the driver for stepping on the brake pedal, and then obtaining a braking deceleration a required by a vehicle at the moment according to a vehicle braking characteristic matching parameter table;

step II: determining whether the driver is in an emergency braking or not according to an opening degree of the brake pedal and the speed of stepping on the brake pedal; if yes, closing the energy recovery function;

step III: when the energy recovery function is switched off, entering a working state under the normal condition, and directly performing a hydraulic braking;

when the energy recovery function is switched on, entering, by the bypass energy storage device, a working state during a pressurization process, and distributing an electric braking torque and an hydraulic braking torque; and step VI: when the driver releases the brake pedal or is in a process of releasing, entering, by the bypass energy storage device, a pressure-relief process;

working states of the bypass energy storage device comprise the pressurization process and the pressure-relief process; wherein the pressurization process is as follows: after the electronically controlled hydraulic controller detects the driver steps on the brake pedal and the vehicle simultaneously starts the energy recovery function, the first inlet valve and the second inlet valve are opened, the fourth isolation valve and the fifth isolation valve are closed, and the brake fluid enters the energy accumulator through the brake master cylinder, the first inlet valve and the second inlet valve;

braking forces on wheels are provided by back-dragging of a driving motor, the vehicle performs a braking energy recovery work, the electronically controlled hydraulic controller monitors the opening degree of the brake pedal at all times, and magnitudes of a total braking force request and a back-drag torque are determined;

when the back-drag torque is insufficient, the first inlet valve and the second inlet valve are closed, the fourth isolation valve and the fifth isolation valve are opened, and an insufficient braking force is supplemented with a hydraulic pressure; the back-dragging of the driving motor and a mechanical braking co-work in a serial mode to achieve a deceleration effect of the vehicle;

the pressure-relief process is as follows: in a pressure reduction stage, as the driver releases the brake pedal or is in the process of releasing, the first inlet valve and the second inlet valve are powered off and closed, the fourth isolation valve and the fifth isolation valve are powered off and opened, and the third return valve is powered on and opened according to pressures of the first and the second pipelines, as the brake pedal is not stepped on or a pressure of a main hydraulic circuit is small at the moment, a pressure of the brake master cylinder does not exist, and under an action of a pressure of the energy accumulator, the brake fluid in a low-pressure energy accumulator returns to the brake master cylinder through the third return valve under an action of an internal spring.

2. The control method of the bypass energy storage device for the electronically controlled hydraulic braking system according to claim 1, wherein the first pipeline is connected with a pressure sensor for sensing a pressure of the first pipeline.

3. The control method of the bypass energy storage device for the electronically controlled hydraulic braking system according to claim 1, wherein the energy accumulator is a spring-type low-pressure energy accumulator.

4. The control method of the bypass energy storage device for the electronically controlled hydraulic braking system according to claim 1, wherein each valve of the bypass energy storage device is controlled to be opened and closed by an electronically controlled hydraulic controller EHC, and the electronically controlled hydraulic controller EHC is also connected with a battery controller BCM and a motor controller MCU via a high-speed CAN communication.

5. The control method of the bypass energy storage device for the electronically controlled hydraulic braking system according to claim 1, wherein in the step II, if the driver is not in the emergency braking, an electronically controlled hydraulic controller EHC keeps communicating with two systems of a battery controller BCM and a motor controller MCU at all times, so as to determine whether the vehicle is allowed to enter an energy recovery state or not, and a determination is performed according to a judgment basis including constant changes of the back-drag torque of the driving motor along with vehicle speeds, an SOC, a temperature, a current, and communication faults of a power battery.

6. The control method of the bypass energy storage device for the electronically controlled hydraulic braking system according to claim 5, wherein in the step III, a reference calculation formula for distributing the electric braking torque and the hydraulic braking torque is as follows:

$$\text{if } Fe+Fh+f_{roll}+f_{aero}=Ma \quad (1)$$

$$\text{then } Fe=Ma-Fh-f_{roll}-f_{aero} \quad (2)$$

in the reference calculation formula, Fe is a braking force of the driving motor in a unit of N·m; Fh is an electronically controlled hydraulic braking force in a unit of N·m; $F_{roll}$ is a rolling resistance of the vehicle in a unit of N·m; $f_{aero}$ is a wind resistance in a unit of N·m; a is the braking deceleration in a unit of m/s$^2$; m is a mass of the whole vehicle in a unit of kg;

wherein the rolling resistance of the vehicle is expressed in a formula (3) as follows:

$$f_{roll}=Mg\mu\cos a \quad (3)$$

in the formula (3), u is a rolling resistance coefficient; M is the mass of the vehicle in a unit of kg; a is a slope angle, i is a gradient, and a=arctan (i);

the wind resistance of the vehicle is expressed in a formula (4) as follows:

$$F_{aero}=0.5\ \rho k A_f V^2 \quad (4)$$

in the formula (4), k is a wind resistance coefficient; $A_f$ is a frontal area in a unit of m$^2$; V is a speed of the vehicle in a unit of km/h; ρ is an air density and taken as 1.3 kg/m$^2$.

7. The control method of the bypass energy storage device for the electronically controlled hydraulic braking system according to claim 6, wherein in the step III, a rechargeable power generates torque shown in a formula (5) as follows:

$$Pc = \frac{9550Pc}{n} \quad (5)$$

in the formula (5), Pc is the rechargeable power in a unit of Kw; n is a rotating speed of the driving motor in a unit of rpm;

a corresponding maximum allowable braking torque of the power battery is calculated according to a maximum allowable charging power of the power battery, and if the corresponding maximum allowable braking torque of the power battery is smaller than a maximum allowable braking torque of the driving motor, the energy recovery function is switched off or the corresponding maximum allowable braking torque of the power battery is taken as a maximum electric braking torque request.

* * * * *